(12) United States Patent
Meyer et al.

(10) Patent No.: US 11,991,067 B2
(45) Date of Patent: May 21, 2024

(54) TRAFFIC AGGREGATOR

(71) Applicant: Apple Inc., Cupertino, CA (US)

(72) Inventors: Stefan Meyer, Hoechstadt (DE);
Thorsten Clevorn, Munich (DE);
Bernd W. Adler, San Jose, CA (US);
Bernhard Raaf, Neuried Bavaria (DE);
Josef Hausner, Germering (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/558,202

(22) Filed: Dec. 21, 2021

(65) Prior Publication Data

US 2023/0086510 A1  Mar. 23, 2023

Related U.S. Application Data

(60) Provisional application No. 63/247,001, filed on Sep. 22, 2021.

(51) Int. Cl.
*H04L 45/24* (2022.01)
*H04W 28/10* (2009.01)
*H04W 36/12* (2009.01)

(52) U.S. Cl.
CPC .......... *H04L 45/245* (2013.01); *H04W 28/10* (2013.01); *H04W 36/12* (2013.01)

(58) Field of Classification Search
CPC ...... H04L 45/245; H04W 28/10; H04W 36/12
See application file for complete search history.

(56) References Cited

U.S. PATENT DOCUMENTS

| | | |
|---|---|---|
| 9,220,027 B1 * | 12/2015 | Raleigh ................. H04W 80/04 |
| 11,095,334 B1 | 8/2021 | Mohammadnezhad et al. |
| 2018/0338260 A1 * | 11/2018 | Hsu ........................ H04W 72/21 |
| 2023/0018104 A1 * | 1/2023 | Wang ................... A61B 10/0051 |

* cited by examiner

*Primary Examiner* — Khaled M Kassim
*Assistant Examiner* — Najeeb Ansari
(74) *Attorney, Agent, or Firm* — Treyz Law Group, P.C.; Tianyi He

(57) ABSTRACT

A system may include a client device running multiple client-side applications and server equipment running multiple server-side applications. One or more traffic aggregators may be provided between the client-side applications and the server-side applications. Each traffic aggregator may aggregate application traffic from the multiple applications to form one or more classes of aggregated data. Interfaces may be provided between the traffic aggregators and the applications to customize application traffic. Traffic aggregators in the system may be dynamically updated.

20 Claims, 11 Drawing Sheets

TRAFFIC AGGREGATOR

This application claims the benefit of U.S. provisional patent application No. 63/247,001, filed Sep. 22, 2021, which is hereby incorporated by reference herein in its entirety.

FIELD

This disclosure relates generally to electronic devices, including electronic devices with wireless circuitry.

BACKGROUND

Electronic devices are often provided with wireless capabilities. An electronic device with wireless capabilities has wireless circuitry that includes one or more antennas coupled to one or more radios.

If care is not taken, the wireless circuitry can consume excess power. This can be especially detrimental to a portable electronic device having limited battery capacity. It can be challenging to control wireless circuitry power consumption while providing a user with device functionalities.

SUMMARY

A system can include a client device running multiple client-side applications and server equipment (e.g., multiple servers) running multiple server-side applications. One or more (wireless or wired) communication links of different types may communicatively couple the client device to the server equipment. One or more traffic aggregators may be provided between the client-side applications and the server-side applications. Each traffic aggregator may receive configuration data and may aggregate application traffic from the multiple applications to form one or more classes of aggregated data based on the configuration data. The aggregated data may be conveyed using periodic data bursts.

If desired, interfaces may be provided between the traffic aggregators and the applications to customize application traffic. In particular, applications and/or traffic aggregators may specific various characteristics based on which the application traffic is provided to the applications and/or the traffic aggregators.

If desired, traffic aggregators in the system may be dynamically updated. In particular, based on different considerations such as traffic aggregator link quality, availability of additional devices in the system that are configurable to implement traffic aggregators, and other consideration, existing traffic aggregators in the system may perform handover operations to new traffic aggregators.

An aspect of the disclosure provides wireless communication equipment. The wireless communication equipment can include processing circuitry configured to run a first application that generates a first data stream and to run a second application that generates a second data stream. The wireless communication equipment can include a traffic aggregator configured to generate an aggregated data stream exhibiting periodic data bursts of aggregated data based on the first data stream and the second data stream. The wireless communication equipment can include wireless circuitry configured to convey the aggregated data stream.

An aspect of the disclosure provides a method of handling application traffic. The method can include receiving, by a traffic aggregator, an aggregated data burst for a first application and for a second application through a wireless communication link. The method can include generating, by the traffic aggregator, a first data stream for the first application based on the aggregated data burst. The method can include generating, by the traffic aggregator, a second data stream for the second application based on the aggregated data burst.

An aspect of the disclosure provides a wireless communication system. The wireless communication system can include a first device having one or more processors configured to run a first application and to run a second application. The wireless communication system can include a second device having one or more processors configured to receive first application traffic for the first application, to receive second application traffic for the second application, and to convey the first application traffic and the second application traffic as aggregated data using a wireless communication link.

DETAILED DESCRIPTION

Figure 1:
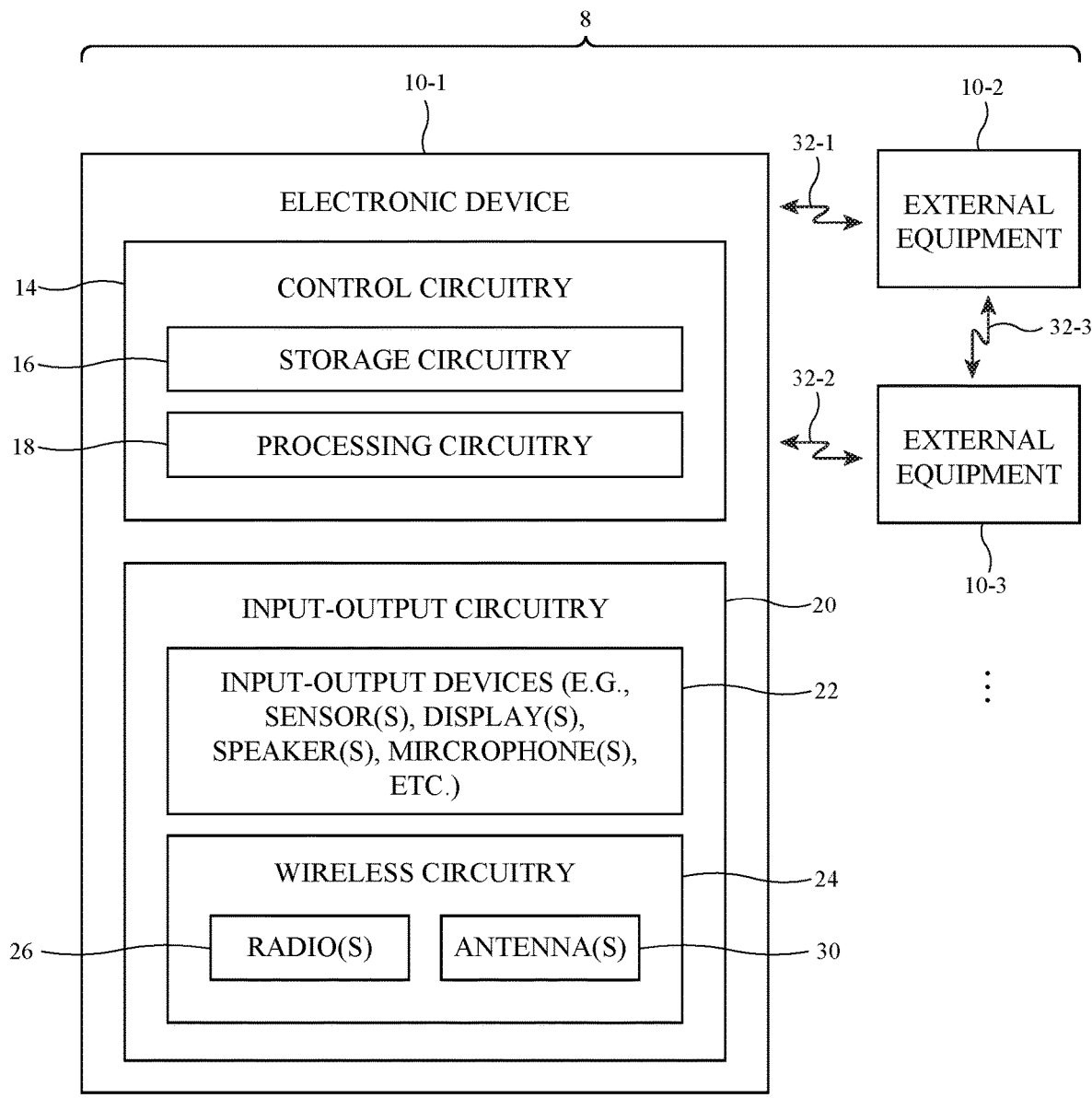
FIG. 1 is a block diagram of an illustrative system having one or more electronic devices with wireless circuitry in accordance with some embodiments.

A schematic diagram of an illustrative system such as a wireless communication system is shown in FIG. 1. As shown in FIG. 1, system 8 may include one or more electronic devices or equipment such as electronic device 10-1, equipment 10-2 (external to device 10-1), equipment 10-3 (external to device 10-1), and any other additional devices or equipment. Devices or equipment associated with a (cellular or mobile) network may be referred to as network equipment, while devices or equipment used by a user in conveying data to and from the network may be referred to as user equipment. System 8 may include user equipment and network equipment (each of which may sometimes be referred to herein as wireless communication equipment).

Device 10 of FIG. 1 (referring to any of device or equipment 10-1, 10-2, 10-3, or any other device or equipment in system 8) may be a wireless communication device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, one or more other network components for a radio access network, one or more other network components linking user equipment to a core network, equipment that implements the functionality of two or more of these devices, or other wireless communication equipment.

The functional block diagram of FIG. 1 shows how device 10-1 may have different functional components. Equipment 10-2 and equipment 10-3 may have one or more of the same functional components of device 10-1 (e.g., may have wireless circuitry such as one or more radios and one or more antennas, may have control circuitry such as one or more processors and storage circuitry, etc.), may omit one or more components of device 10-1, and/or may have additional components, if desired. These components of equipment 10-2 and equipment 10-3 are not shown for the sake of clarity. The operation and/or configuration of components in device 10-1 as described herein similarly provide support for the operation and/or of the corresponding component implemented in any of devices or equipment in system 10 (e.g., equipment 10-2, equipment 10-3, etc.).

Device 10-1 may include components located on or within a housing. The housing, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of the housing may be formed from dielectric or other low-conductivity material (e.g., glass, ceramic, plastic, sapphire, etc.). In other situations, the housing or at least some of the structures that make up the housing may be formed from metal elements.

Device 10-1 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10-1 and/or removable storage media.

Control circuitry 14 may include processing circuitry such as processing circuitry 18. Processing circuitry 18 may be used to control the operation of device 10-1. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10-1 using hardware (e.g., dedicated hardware or circuitry), firmware, and/or software. Software code for performing operations in device 10-1 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10-1 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10-1 may include input-output circuitry 20. Input-output circuitry 20 may include input-output devices 22. Input-output devices 22 may be used to allow data to be supplied to device 10-1 and to allow data to be provided from device 10-1 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors, temperature sensors, etc. In some configurations, keyboards, headphones, displays, pointing devices such as trackpads, mice, and joysticks, and other input-output devices may be coupled to device 10-1 using wired or wireless connections.

Input-output circuitry 20 may include wireless circuitry 24 to support wireless communications and/or radio-based spatial ranging operations. Wireless circuitry 24 may include one or more antennas 30. Wireless circuitry 24 may also include one or more radios 26. Each radio 26 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 30. These components of each radio 26 may be mounted onto a respective substrate or integrated into a respective integrated circuit, chip, package (e.g., system-in-package), or system-on-chip (SOC). If desired, the components of multiple radios 26 may share a single substrate, integrated circuit, chip, package, or SOC.

Antenna(s) 30 may be formed using any desired antenna structures. For example, antenna(s) 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Wireless circuitry 24 may include any desired number of antennas 30. Some or all of the antennas 30 in wireless circuitry 24 may be arranged into one or more phased antenna arrays (e.g., for conveying radio-frequency signals over a steerable signal beam). Filter circuitry, switching circuitry, impedance matching circuitry, and/or other antenna tuning components may be adjusted to adjust the frequency response and wireless performance of antenna(s) 30 over time.

Transceiver circuitry in radios 26 may convey radio-frequency signals using one or more antennas 30 (e.g., antenna(s) 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) 30 each involve the excitation or resonance of antenna currents on an antenna resonating element in the antenna by the radio-frequency signals within the frequency band(s) of operation of the antenna.

Each radio 26 may be communicatively coupled to one or more antennas 30 over one or more radio-frequency transmission lines. One or more radio-frequency transmission lines may be shared between radios 26 and/or antennas 30 if desired. Radio-frequency front end (RFFE) modules may be interposed on one or more radio-frequency transmission lines. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines.

Radios 26 may use antenna(s) 30 to transmit and/or receive radio-frequency signals within different frequency bands at radio frequencies (sometimes referred to herein as communications bands or simply as a "bands"). The frequency bands handled by radios 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 26 may transmit and/or receive radio-frequency signals according to a respective radio access technology (RAT) that determines the physical connection methodology for the components in the corresponding radio. One or more radios 26 may implement multiple RATs if desired. As just one example, the radios 26 in device 10-1 may include a UWB radio for conveying UWB signals using one or more antennas 30, a Bluetooth (BT) radio for conveying BT signals using one or more antennas 30, a Wi-Fi radio for conveying WLAN signals using one or more antennas 30, a cellular radio for conveying cellular telephone signals using one or more antennas 30 (e.g., in 4G frequency bands, 5G FR1 bands, and/or 5G FR2 bands), an NFC radio for conveying NFC signals using one or more antennas 30, and a wireless charging radio for receiving wireless charging signals using one or more antennas 30 for charging a battery on device 10-1. This example is merely illustrative and, in general, radios 26 may include any desired combination of radios for covering any desired combination of RATs. If desired, antenna(s) 30 may be operated using a multiple-input and multiple-output (MIMO) scheme and/or using a carrier aggregation (CA) scheme.

Radios 26 may use antennas 30 to transmit and/or receive radio-frequency signals 32-1 and 32-2 to convey wireless communications data between device 10-1 and external wireless communications equipment such as external equipment 10-2 and 10-3 (e.g., using corresponding radios and antennas on external equipment 10-2 and external equipment 10-3). Equipment 10-2 and 10-3 may also communicate with each other (using corresponding wireless circuitry)

via radio-frequency signals 32-3. The wireless communications data conveyed by radios 26 may, for example, include data that has been encoded into corresponding data packets such as wireless data associated with a telephone call, streaming media content, internet browsing, wireless data associated with software applications running on device 10-1, email messages, etc.

The example of FIG. 1 is merely illustrative. While control circuitry 14 is shown separately from wireless circuitry 24 in the example of FIG. 1 for the sake of clarity, wireless circuitry 24 such as radio 26 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24 or radio 26). One or more portions (e.g., all) of each radio 26 itself may sometimes be referred to herein as a radio component such that the one or more processors may operate the one or more radio components (e.g., associated with different radios).

Configurations in which device 10-1 is a cellular device (having wireless circuitry configured to connect with a cellular network) are sometimes described herein as an illustrative example. In some scenarios, device 10-1 (one or more processors in device 10-1) may run, in parallel, a number of applications such as an application for streaming media content, an application for browsing the internet, an application for accessing an email account, an application for instant messaging, etc. In the absence of other wireless communication links, device 10-1 may transmit and/or receive data for the multiple applications via a cellular wireless communication link (e.g., using a cellular radio to connect to a cellular network). However, without more, the multiple applications may each send data to and/or receive data from the cellular radio in a sporadic, uncoordinated, and generally independent manner with respect to the other applications. This can lead to frequent or continuous use of the cellular radio and consume excess power. Especially in configurations where device 10-1 is a device with limited battery capacity, this can significantly drain the battery of the device.

Figure 2:
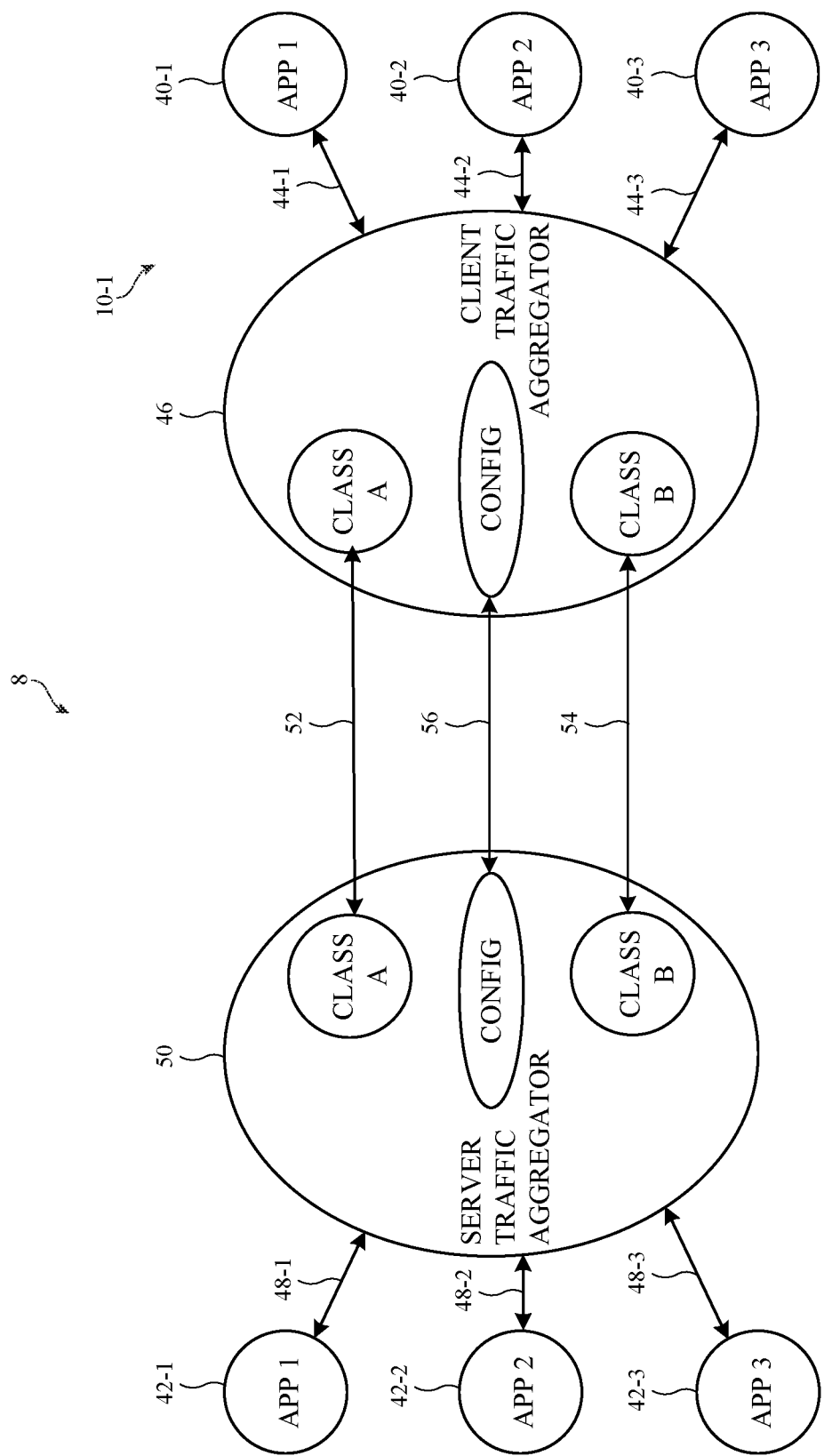
FIG. 2 is a block diagram of illustrative traffic aggregators within a wireless communication system in accordance with some embodiments.

In order to mitigate these issues, the application traffic from multiple applications can be routed through one or more traffic aggregators that aggregate and coordinate the application traffic. FIG. 2 is an illustrative block diagram showing traffic aggregators in a wireless communication system 8 routing application traffic between client-side and server-side devices.

As shown in FIG. 2, client device 10-1 (e.g., one or more processors on device 10-1) may run application 40-1, 40-2, and 40-3 each requiring the conveyance of data to and from a corresponding application (e.g., application 42-1 for application 40-1, application 42-2 for application for 40-2, and application 40-3 for application 40-3) running on one or more processors on different server equipment (different servers), or in some scenarios, the same server (e.g., formed from other devices 10 in system 8 in FIG. 1).

Instead conveying data independently, applications 40-1, 40-2, and 40-3 using corresponding communication links 44 (e.g., link 44-1 for application 40-1, link 44-2 for application 40-2, and link 44-3 for application 40-3) may pass data to and/or receive data from a traffic aggregator such as client (-side) traffic aggregator 46. Traffic aggregator 46 may convey data between client-side applications 40-1, 40-2, and 40-3 and server-side devices (e.g., traffic aggregator 50) in an aggregated manner in one direction and in a distributive manner in the other direction. Similarly, on the server side, server-side applications 42-1, 42-2, and 42-3 using corresponding communication links 48 (e.g., link 48-1 for application 42-1, link 48-2 for application 42-2, and link 48-3 for application 42-3) may pass data to and/or receive data from a traffic aggregator such as server(-side) traffic aggregator 50. Traffic aggregator 50 may convey data between server-side applications 42-1, 42-2, and 42-3 and client-side devices (e.g., traffic aggregator 46) in an aggregated manner in one direction and in a distributive manner in the other direction.

To facilitate the operation of the traffic aggregators, the traffic aggregators may be configurable (e.g., may receive configuration data that configure the operation of the traffic aggregators). Based on the configuration data, the traffic aggregators may define one or more classes of traffic. Each traffic class may be defined any number of parameters such as the one or more applications or types of applications that are included by the traffic class, the cadence for conveying the aggregated data (e.g., to the server-side equipment for a client-side traffic aggregator or to the client-side equipment for a server-side traffic aggregator), the threshold of aggregated data at which a transmission is performed, the amount of data to be transmitted per transmission burst, type of compression (if any) to be performed for the aggregated data, priority events or data, or any other suitable parameters. In particular, high priority events or data identified by the configuration information may be handled (sent) in real-time without aggregation to avoid compromising (delaying) high priority data transmission and reception. In contrast, lower priority data may be aggregated. The configuration data received by the traffic aggregators may be indicative of one or more of these parameters.

In the example of FIG. 2, one or both of traffic aggregators 46 and 50 may receive configuration data that define one or more of the above-mentioned parameters to form aggregated data in traffic class A, which is communicated between traffic aggregators 46 and 50 using link 52. One or both of traffic aggregators 46 and 50 may receive configuration data that define one or more of the above-mentioned parameters to form aggregated data in traffic class B, which is communicated between traffic aggregators 46 and 50 using link 54.

Configuration data received by one traffic aggregator may be conveyed to the other traffic aggregator using link 56. Using link 56, traffic aggregators 46 and 60 may also negotiate, update, or change parameters of aggregated traffic depending on the type and configuration (e.g., capabilities) of the traffic aggregators themselves and/or the type and configuration (e.g., capabilities) of the client-side and server-side devices.

If desired, to simplify the configuration of traffic aggregators such as traffic aggregators 46 and 50, the traffic aggregators may operate in a default or automatic mode with predetermined traffic profiles (e.g., predetermined definitions of one or more traffic classes) without additional user input on the configuration of the traffic aggregators or defining the traffic classes. If desired, the traffic aggregators, after operating in the automatic mode for a time period, may apply machine learning or artificial intelligence algorithms to the traffic flow during the time period (and/or other data) and update or optimize the mode of operation (e.g., adjust the traffic class definitions). If desired, the user may provide targets relating to one or more of the parameters for traffic classes and other additional user inputs to update the default or automatic mode of operation.

Traffic aggregators such as traffic aggregators 46 and 50 may be implemented on suitable device or equipment (e.g., using one or more processors for wireless circuitry or control circuitry, and using storage circuitry for the one or more processors) and accordingly communication links such as communication links 44-1, 44-2, 44-3, 48-1, 48-1, 48-3, 52, 54, and 54 may be implemented in any suitable manner (e.g., depending on the implementation of the corresponding traffic aggregators. In general, any suitable number of devices of one or more types, such as those described in connection with device 10 in FIG. 1, may implement each traffic aggregator.

In some illustrative arrangements, traffic aggregator 46 may be implemented on device 10-1, which also runs applications 40-1, 40-2, and 40-3. In particular, one or more processors on device 10-1 may process software instructions to run applications 40-1, 40-2, and 40-3 and may also process software instructions to perform the functions of traffic aggregator 46. The one or more processors performing the functions of traffic aggregator 46 may still send traffic to and receive traffic from wireless circuitry used to convey the application data. If desired, one or more processors for control circuitry 14 may run application 40-1, 40-2, and 40-3, while one or more processors for wireless circuitry 24 (e.g., a cellular radio 26) may perform the functions of traffic aggregator 46. In these configurations, links 44-1, 44-2, and 44-3 may be implemented using wired (e.g., non-wireless) paths such as one or more data buses, one or more routing lines, etc., internally within device 10-1 that connect the one or more processors to one another. Outwardly facing links such as links 52, 54, and 56 to server-side external equipment (e.g., equipment implementing traffic aggregator 50) may be wireless communication links such as a cellular communication link, a WPAN communication link, a WLAN communication link, etc. formed by wireless circuitry in device 10-1, or in other scenarios, wired links. While links 52, 54, and 56 are shown separately, they may be formed using a single communication link.

In some illustrative arrangements, traffic aggregator 46 may be implemented on a device external to device 10-1 such as external equipment 10-3 (sometimes referred to as device 10-3). Configurations in which device 10-1 is a smaller device such as a wristwatch device, a pendant device, a headphone or earpiece device, a device embedded in eyeglasses or other equipment worn on a user's head, or other wearable or miniature device and device 10-3 is a larger device such as a laptop computer, a desktop computer, a computer monitor containing an embedded computer, a tablet computer, a cellular telephone, a media player, or other handheld or portable electronic device are described herein as an illustrative example. If desired, devices 10-1 and 10-3 may each be implemented using any type of device. In particular, while one or more processors on device 10-1 run application 40-1, 40-2, and 40-3, one or more processors on device 10-2 may process software instructions to form the functions of traffic aggregator 46. As an example, device 10-1 may convey via, a wireless (or wired) communication link such as a WPAN link, a WLAN link, a non-cellular link, etc., data streams from applications 40-1, 40-2, and 40-3 to device 10-3, and the one or more processors on device 10-3 may aggregate the received application data into different traffic classes and convey the aggregated data to server-side equipment (e.g., server traffic aggregator 50).

In some illustrative arrangements, traffic aggregator 50 may be implemented on network equipment such as network equipment 10-2 to which the one or more servers running server-side applications 42-1, 42-2, and 42-3 are communicatively coupled. In this configuration, links 48-1, 48-2, and 48-2 may each be formed from wired or wireless links implemented using any suitable technologies and protocols. Network equipment 10-2 may be associated with a cellular network (as an example) and may include one or more processors performing the functions of traffic aggregator 50. The same or different one or more processors in network equipment 10-2 may also perform wireless communication functions that convey (e.g., distributed and/or aggregated) application data between the one or more servers and the client-side equipment (e.g., device 10-1 running applications 40-1, 40-2, and 40-3, and/or implementing traffic aggregator 46). In the scenario where network equipment 10-2 implementing aggregator 50 is associated with a cellular network (e.g., forms part of a base station, forms a part of the core network, form an intervening network element, etc.), links 52, 54, and 56 (or a single link forming these links) may be implemented as a cellular link such as a cellular link from device 10-1 implementing aggregator 46.

These illustrative arrangements are provided merely as examples. If desired, any suitable hardware (e.g., one or more processors in one or more devices) in conjunction with the corresponding software instructions (e.g., stored on corresponding storage circuitry in the one or more devices) may implement the functionalities shown in FIG. 2 such as running application on either the server side or the client side, and performing traffic aggregation functions on either the server side or the client side. One or more processors for wireless circuitry in the one or more devices may implement traffic aggregator functions or may simply relay (aggregated) application data to/from other one or more processors (e.g., for control circuitry) in the one or more devices that perform traffic aggregator functions.

Figure 3:
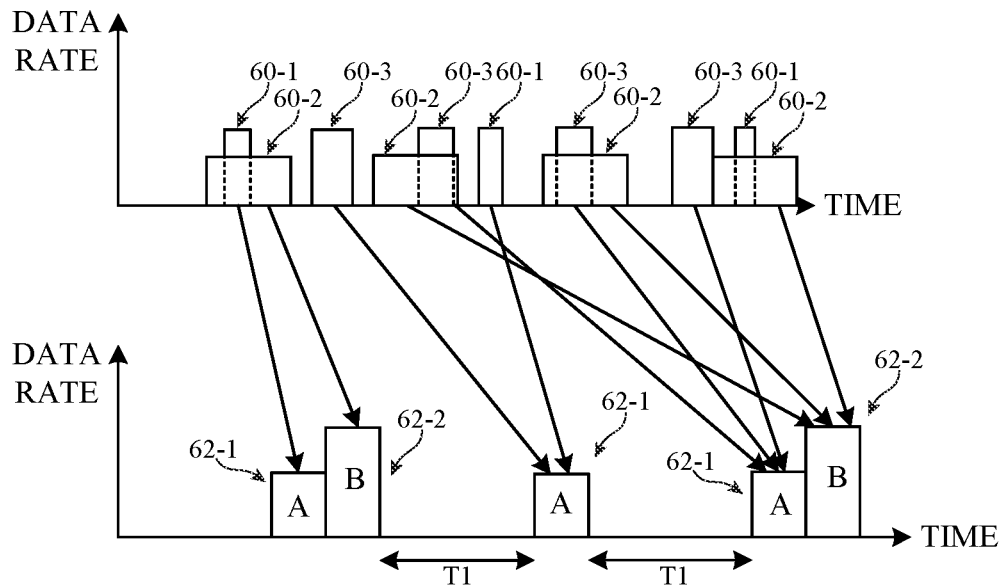
FIG. 3 is an illustrative timing diagram showing effects of traffic aggregation in accordance with some embodiments.

FIG. 3 is an illustrative timing diagram showing the effects of performing traffic aggregation (e.g., in the manner as described in connection with FIG. 2). The top plot of FIG. 3 shows data rates associated with transmission of unaggregated data from three illustrative data streams (e.g., each associated with a different application running on device 10-1). In other words, wireless circuitry such as a cellular radio component 26 in device 10-1 may actively convey data for each data stream 60-1, 60-2, and 60-3. Because the conveyance of these data streams is independent (each data stream has its own periodicity, data rate, etc.), the cellular radio component 26 on device 10-1 may (for the most part) continuously in operation or at least in operation for the majority of a particular time period.

The bottom plot of FIG. 3 shows data rates associated with transmission of aggregated data generated (e.g., using aggregator 46 in FIG. 2) from the three illustrative data streams in the top plot. In particular, in the example of FIG. 3, portions of data stream 60-1 and of data stream 60-3 may be aggregated to form aggregated data (stream) 62-1 associated with traffic class A and portions of data stream 60-2 may be aggregated to form aggregated data (stream) 62-2 associated with traffic class B. In this example, aggregated data 62-1 and 62-2 may be sent in periodic bursts of data (e.g., when the aggregated data meets a certain threshold). Accordingly, aggregated data 62-1 for traffic class A and aggregated data 62-2 for traffic class B may have different thresholds for performing data transmission (and accordingly perform transmissions at different frequencies or with different periodicity as shown in FIG. 3), different data rates for transmission, different durations of transmission, or other different characteristics defined by the configuration data for the traffic aggregator. Regardless of the differing characteristics for different traffic classes, by aggregating network traffic, the (cellular) radio component 26 may be actively perform data transmission for the multiple applications only during these periodic bursts, leading to periods of inactivity T1, during which radio component 26 may be in an inactive state (e.g., in a sleep state, an idle state, a radio-off state, or other low-power state). This may therefore allow power to be conserved, thereby reducing power consumption of wireless circuitry for device 10-1.

While described in the context of data transmission, one or more corresponding traffic aggregators may be used for data reception in a similar manner (e.g., receiving aggregated data bursts for multiple application separated by periods of inactivity). While described in the context of radio components and one or more traffic aggregators on the client side, one or more traffic aggregators on the server side may transmit and receive aggregated data bursts in a similar manner.

Figure 4:
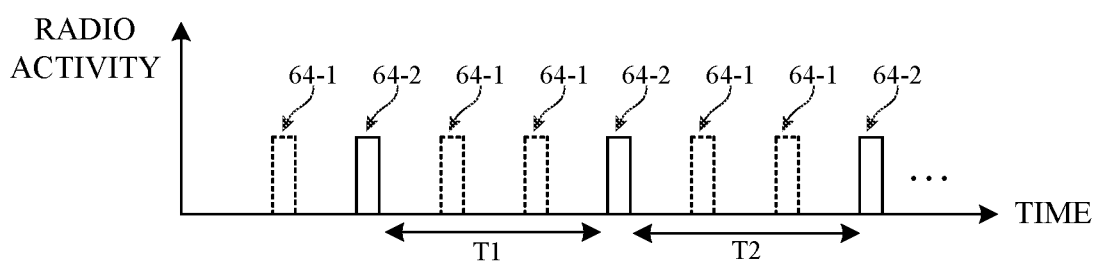
FIG. 4 is an illustrative timing diagram showing a modified radio mode of operation in accordance with some embodiments.

Toward a similarly aim, wireless circuitry in device 10-1 such as a cellular radio component 26 may operate in a modified idle mode based on configurable traffic aggregators. In particular, FIG. 4 shows an illustrative timing diagram for operating wireless circuitry such as a radio component 26 in an idle mode. As shown in FIG. 4, when operating in an idle mode (e.g., in accordance with a cellular telephone protocol), radio component 26 may perform periodic network paging detection operations 64 (referring to operations 64-1 and 64-2, collectively) to detect and decode paging messages sent by the network. However, this may be power consuming.

To reduce power consumption, a traffic aggregator for device 10-1 (e.g., a traffic aggregator between the network and device 10-1, and/or a traffic aggregator implemented using radio component 26 in device 10-1) may aggregate different (network) traffic (e.g., traffic streams from different applications) to create or define periods of inactivity (e.g., inactive periods) during which no network paging indicating new traffic is required. In other words, the conveyance of some network traffic may be delayed momentarily through the aggregation process to create the periods of inactivity. Accordingly, the traffic aggregator may convey the aggregated network traffic to radio component 26 (and the traffic aggregator implemented on radio component 26 may receive the aggregated network traffic) only during periodic data bursts that are separated by the periods of inactivity. Device 10-1 (e.g., radio component 26) may therefore align its operation (e.g., radio activity) to the periodic operation of the traffic aggregator by omitting the associated paging operations during these periods of inactivity as the traffic aggregator ensures that no new traffic can occur during these periods of inactivity. As such, one or more of paging detection operations overlapping the periods of inactivity (when no transmission and reception between the traffic aggregators occur) such as paging detection operations 64-1 may be omitted. In other words, radio component 26 may only wake-up to perform paging detection operations 64-2 aligned with traffic aggregator activity or may generally perform paging detection more infrequently, thereby allowing longer time periods of radio inactivity T2.

If desired, radio component 26 may be placed in a sleep state, a radio-off state, or other low-power state during time periods T2 between consecutive detection operations 64-2. In particular, depending on factors such as power consumption of radio 26, the mobility of device 10-1, etc., during time period T2, radio component 26 may perform one or more limited paging detection operations, may begin a sleep mode with periodic wake-ups to re-acquire the cell, or may be turned off.

Figure 5:
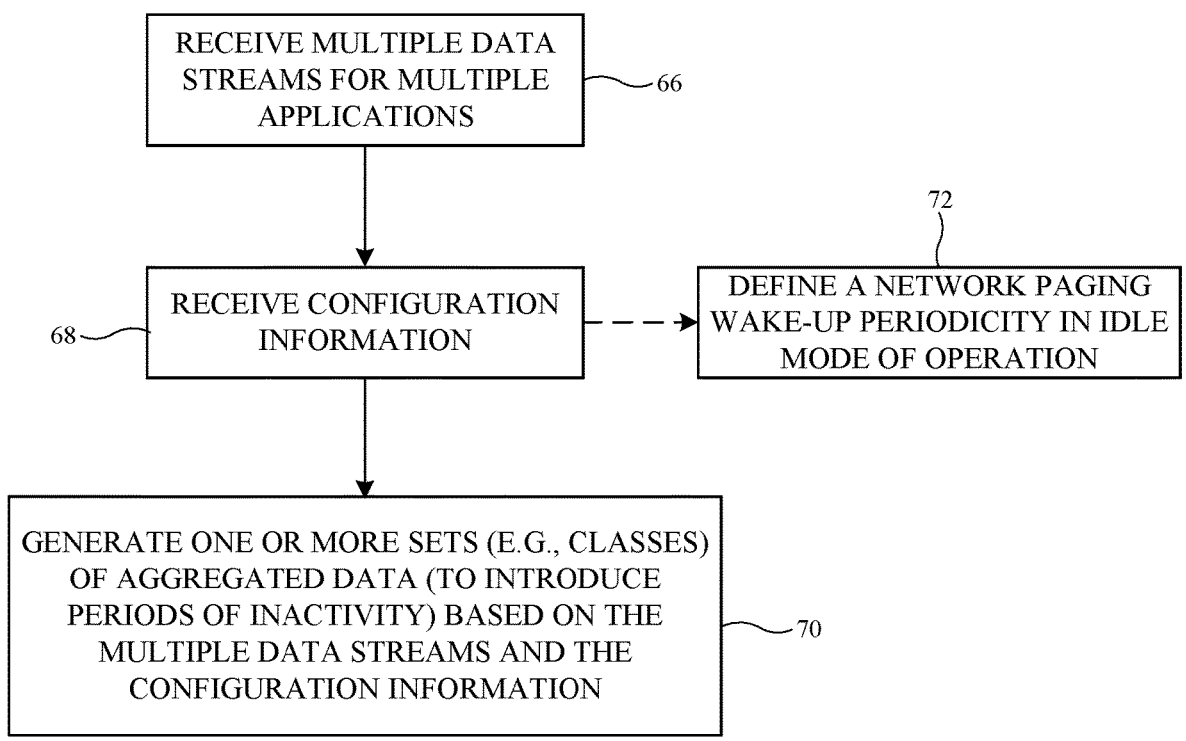
FIG. 5 is a flowchart of illustrative operations for aggregating data streams for multiple applications in accordance with some embodiments.
Figure 6:
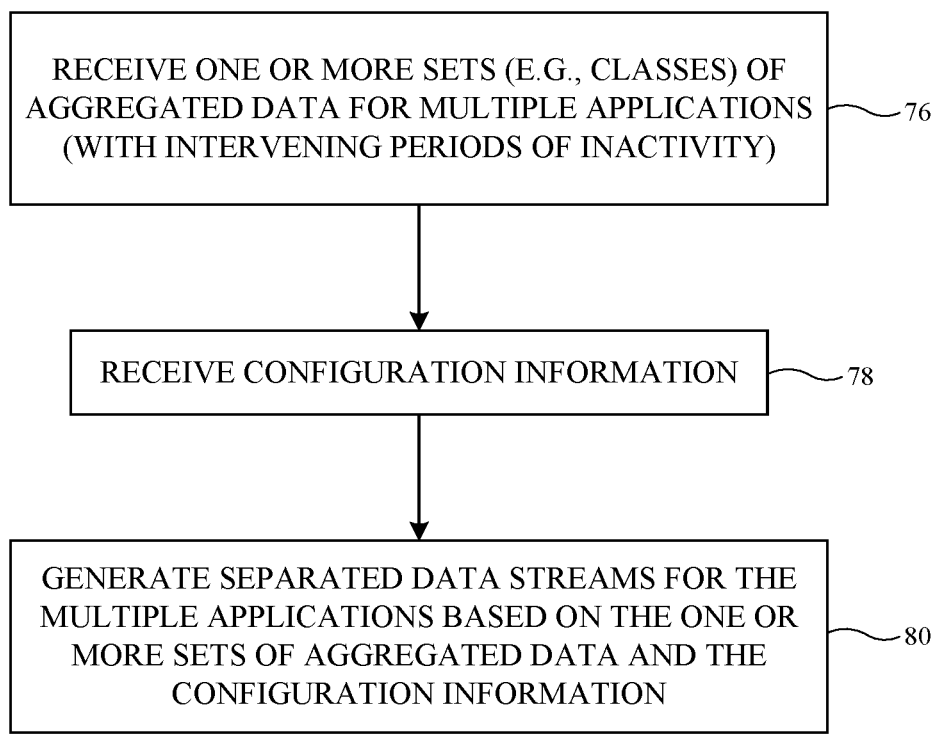
FIG. 6 is a flowchart of illustrative operations for distributing aggregated data streams for multiple applications in accordance with some embodiments.

FIGS. 5 and 6 are flowcharts of illustrative operations for performing traffic aggregator functions (e.g., aggregating data streams for multiple applications in FIG. 5 and distributing aggregated data streams for multiple applications in FIG. 6). One or more (e.g., all) operations in FIGS. 5 and 6 may be performed by one or more processors implementing portions of wireless circuitry 24 such as one or more radios 26, implementing portions of processing circuitry 16, and/or implementing portions of other components in device 10-1, or performed by one or more processors implementing corresponding portions of other devices in system 8. The one or more operations in FIGS. 5 and 6 may be stored as software instructions on storage circuitry (e.g., a non-transitory computer-readable storage medium) associated with the one or more processors and executable by the one or more processors to perform the one or more operations in FIGS. 5 and 6.

As shown in FIG. 5, at operation 66, one or more processors implementing a traffic aggregator (at the client side or the server side) may receive multiple separate data streams for multiple applications (e.g., from one or more processors in a client-side device running the multiple applications, from one or more servers running server applications on one or more processors). The multiple data streams may be received from the same device or equipment as the one or more processors implementing the traffic aggregator may be from a different device or equipment. As examples, a server-side traffic aggregator implemented on one or more processors of network equipment may receive one or more data streams for the multiple applications from multiple servers (e.g., multiple server equipment), a client-side traffic aggregator implemented on one or more processors of device 10-1 may receive one or more data streams internally from the same or different one or more processors running the multiple applications, a client side traffic aggregator implemented on one or more processors of device 10-3 may receive one or more data stream from device 10-1 having one or more processors running the multiple applications, etc.

At operation 68, the one or more processors implementing the traffic aggregator may receive configuration information. The configuration information may be indicative of different characteristics of the aggregated data such as a number of different traffic classes, characteristics such as cadence, type of compression, included application data, etc., of each traffic class, etc.

At operation 70, the one or more processors implementing the traffic aggregator may generate and send one or more sets (e.g., classes) of aggregated data based on the multiple data streams and the configuration information. In particular, each data stream for a different application may be classified into a traffic class and transmitted with one or more other data streams for one or more other applications in a combined or aggregated manner. If desired the aggregated data may be processed or modified (e.g., compressed, truncated, encapsulated, etc.) depending on the configuration of the traffic aggregator. Each set of (modified or unmodified) aggregated data may be sent using periodic data bursts (short periods of transmission activity) separated by periods of inactivity. The periodic data bursts may have a regular periodicity (e.g., each period of inactivity has the same duration) or an irregular periodicity (e.g., periods of inactivity vary in duration).

Each class of aggregated data may have its own traffic profile (e.g., its own cadence, its own data threshold for transmission, its own data rate, its own compression type etc.) that may be different from those of other classes of aggregated data. The traffic profile of the aggregated data may also differ from the traffic profile of the individual data streams received at operation 66.

The one or more processors implementing the traffic aggregator may convey the different classes of aggregated data over a communication link to an opposing traffic aggregator (e.g., a server traffic aggregator if the sending traffic aggregator is a client traffic aggregator, or a client aggregator if the sending traffic aggregator is a server traffic aggregator). If desired, the aggregated data to be conveyed may be modified (e.g., processed) to use containers and avoid the use of standard packet protocols. In particular, by wrapping the data packets into containers a point-to-point connection may be used via a dedicated link (e.g., a WPAN link).

In an illustrative arrangement, at operation 72, the one or more processors implementing the traffic aggregator may use the received configuration information to define a network paging (detection) wake-up periodicity in a radio idle mode of operation. As an example, one or more processors for radio component 26 in device 10-1 may implement a traffic aggregator that receives configuration information defining an inactivity periodicity or one or more inactivity time periods, which may be conveyed to (negotiated with) a traffic aggregator for a network. Accordingly, during periods of traffic aggregator inactivity, radio component 26 in an idle mode of operation, may omit and at least reduce paging detection wake-up frequency to reduce power consumption.

As shown in FIG. 6, at operation 76, one or more processors implementing a traffic aggregator (at the client side or the server side) may receive one or more sets (e.g., classes) of aggregated data for multiple applications (e.g., from an opposing traffic aggregator).

At operation 78, the one or more processors implementing the traffic aggregator may receive configuration information. The configuration information received at operation 78 may be the same or may include different configuration information than the configuration information received at operation 68 in FIG. 5. In particular, the opposing pair of traffic aggregators may share configuration information and negotiate for configurations compatible the other traffic aggregator. In such a manner, a traffic aggregator may convey aggregated data to the other traffic aggregator in a format that the other traffic aggregator is configured to handle (e.g., having a suitable data rate, compatible with a storage requirement of the other traffic aggregator, etc.). As an example, if the other traffic aggregator has low processing power, the sending traffic aggregator may perform lossy compression to reduce the aggregated data being conveyed to the other traffic aggregator.

At operation 80, the one or more processors implementing the traffic aggregator may generate separated data streams for the multiple applications based on the one or more sets of aggregated data and the configuration information. In such a manner, the traffic aggregator may re-distribute each data stream to the appropriate application (on the server side or on the client side).

Figure 7:
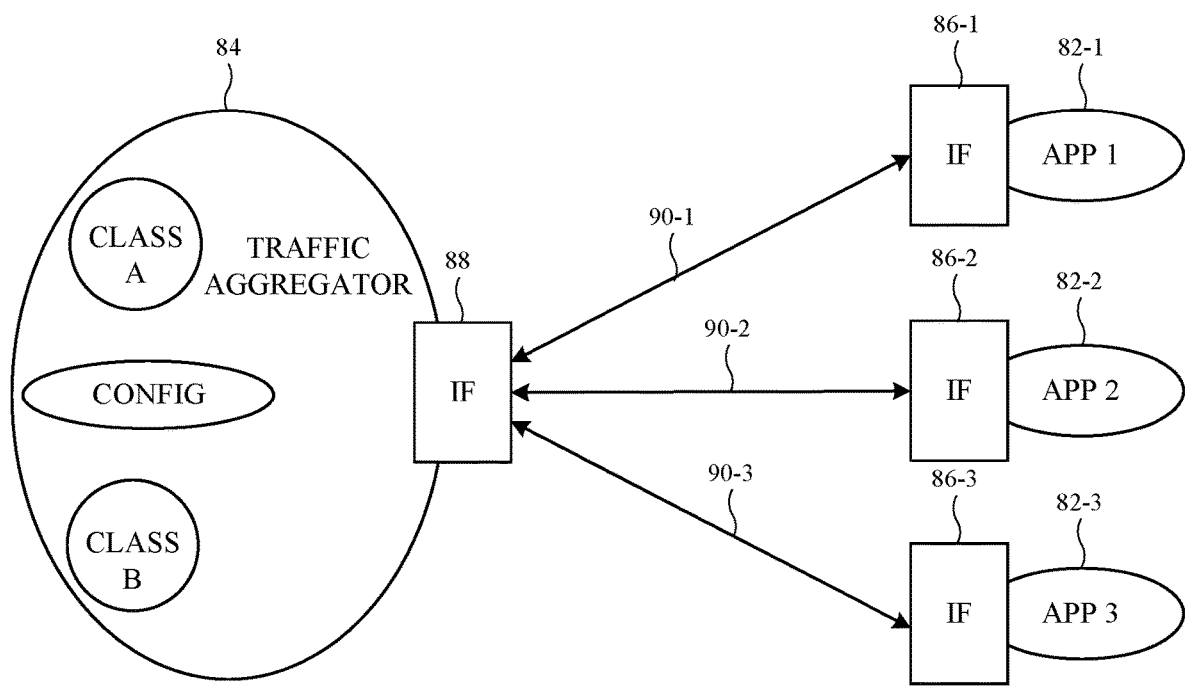
FIG. 7 is a block diagram of an illustrative traffic aggregator and illustrative applications each having a corresponding interface in accordance with some embodiments.

To enhance configurability and customizability of the traffic aggregators, traffic aggregators and their corresponding applications may each be provided with a corresponding (software) interface. FIG. 7 is a block diagram of illustrative interfaces provided to a traffic aggregator and one or more applications from which aggregated data is generated.

As shown in FIG. 7, interfaces 86-1, 86-2, 86-3 may be provided at applications 82-1, 82-2, 82-3, respectively, while interface 88 may be provided at traffic aggregator 84. These interfaces may be provided at client-side devices (e.g., provided in a similar manner to traffic aggregator 46 and applications 40 in FIG. 2) and/or server-side equipment (e.g., provided in a similar manner to traffic aggregator 50 and applications 42 in FIG. 2).

Configured in such a manner, the interfaces allow for additional tailoring of the traffic between each application and the aggregator. In particular, links 90 (collectively referring to links 90-1, 90-2, and 90-3) may be used to convey control data or signals (for controlling traffic behavior) in addition to application data itself.

As examples, links 90 (between corresponding interfaces) may be used to negotiate the data rate as well as a Quality of Service for application data provided between a traffic aggregator and an application, may be used to negotiate the data transfer protocol used between a traffic aggregator and an application, may be used to negotiate the data compression (type or degree) used between a traffic aggregator and an application, may be used to negotiate the cadence used for conveying data between a traffic aggregator and an application, etc. In one arrangement, an application such as application 82-1 may provide to traffic aggregator 84 (through interfaces 86-1 and 88-1 and link 90-1) a requested data rate, a requested type of data compression to be used, and a requested cadence for its application data when received at application 82-1. Analogous requests may be provided along paths 90-2 and 90-3, and/or from traffic aggregator 84 to applications 82 to confirm these requests or to inform the application the expected characteristics (data rate, compression, cadence, etc.) of the application data provided to the application.

These parameters may vary across different devices (e.g., depending on what device or device type) implementing the traffic aggregator and/or running the client or server applications. As an example, in a scenario where a music streaming application 82-1 runs on a cellular telephone, interface 86-1 for application 82-1 on the cellular telephone may request stereo sound data to be sent via link 90-1, and in another scenario where the music stream application 82-1 runs on a dedicated speaker device, interface 86-1 for application 82-1 on the dedicated speaker device may request surround sound data to be sent via link 90-1.

Figure 8:
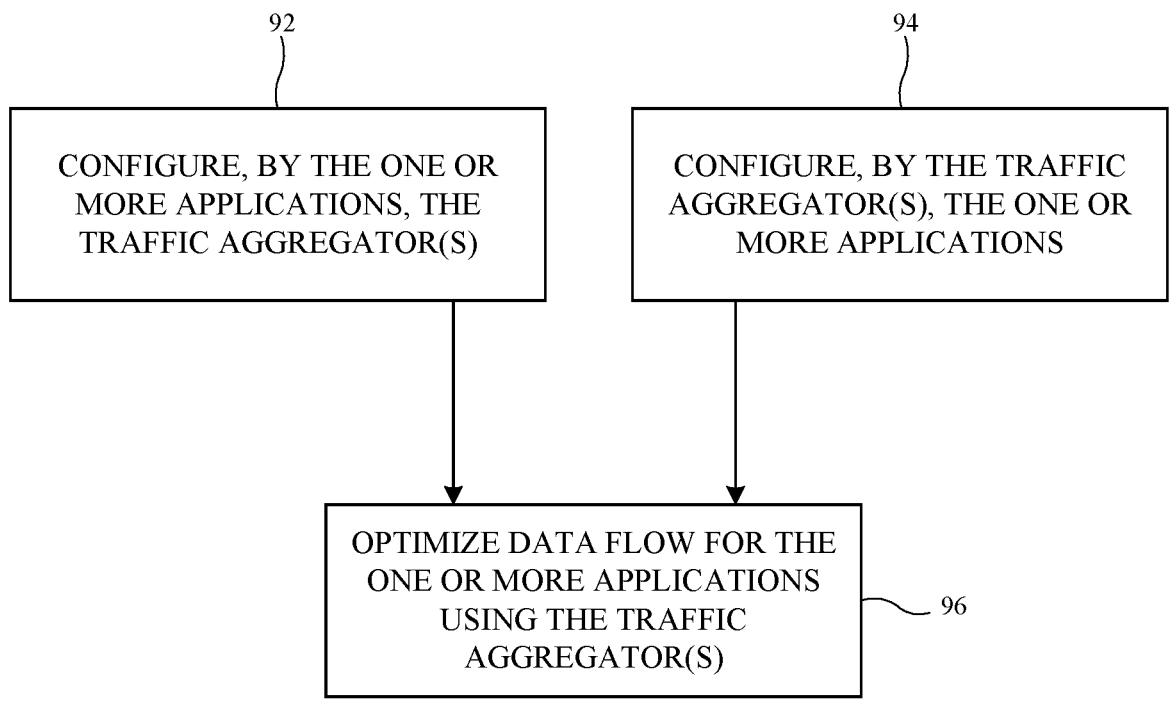
FIG. 8 is a flowchart of illustrative operations for modifying data flow between a traffic aggregator and an application in accordance with some embodiments.

FIG. 8 is a flowchart of illustrative for modifying traffic flow between a traffic aggregator and an application (e.g., using interfaces between the traffic aggregator and the applications as shown in FIG. 7). One or more (e.g., all) operations in FIG. 8 may be performed by one or more processors implementing portions of wireless circuitry 24 such as one or more radios 26, implementing portions of processing circuitry 16, and/or implementing portions of other components in device 10-1, or performed by one or more processors implementing corresponding portions of other devices in system 8. The one or more operations in FIG. 8 may be stored as software instructions on storage circuitry (e.g., a non-transitory computer-readable storage medium) associated with the one or more processors and executable by the one or more processors to perform the one or more operations in FIG. 8.

As shown in FIG. 8, at operation 92, one or more processors implementing a traffic aggregator may be configured by one or more applications (e.g., configured by processors running the one or more applications, which may be the same processors implementing the traffic aggregator or different processors). In particular, the one or more processors may receive requests for one or more data characteristics (e.g., data rate, cadence, data compression, etc.) with which the one or more processors should convey application data for the one or more applications. The one or more processors may therefore be configured to convey application data with the suitable data characteristics for the one or more applications (e.g., to the one or more processors running the one or more applications).

At operation 94, the one or more processors implementing the traffic aggregator may configure one or more applications. In particular, the one or more processors implementing the traffic aggregator may send control signals or other data to one or more applications indicating one or more data characteristics (e.g., data rate, cadence, data compression, etc.) with which the one or more processors will convey application data to the one or more applications. In such a manner, the one or more application may be configured to receive application data as specified by the traffic aggregator.

At operation 96, the one or more processors implementing the traffic aggregator may optimize the data flow for the one or more applications. In other words, the one or more processors may modify the application data to the most suitable form (e.g., having one or more desired characteristics such as those requested by the applications) and provide the modified application data to the one or more applications.

While, as described in connection with FIGS. 7 and 8, the interfaces between traffic aggregator and one or more applications may specify the format of the application data to be conveyed, the traffic itself remains the same (albeit reformatted, conveyed at different rates, etc.). If desired, the interfaces between the traffic aggregator and the one or more applications may also allow the traffic aggregator to adapt the application traffic to be conveyed to the one or more application in different manners (e.g., to translate the application traffic between different traffic types).

Figure 9:
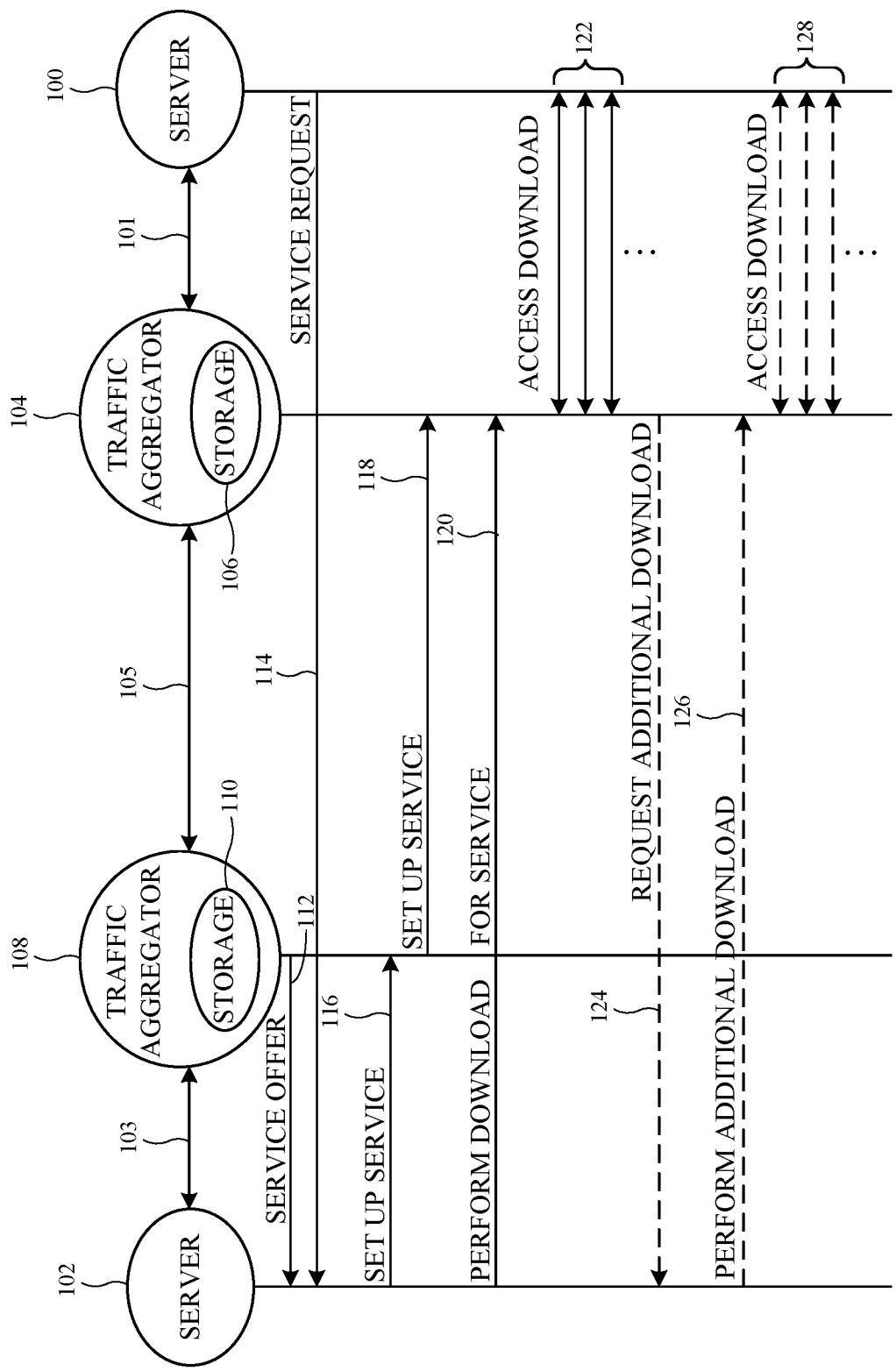
FIG. 9 is a diagram showing the flow of data between different components of a wireless communication system for an illustrative application in accordance with some embodiments.

FIG. 9 is a diagram showing data flow within a wireless communication system such as system 8 in an illustrative arrangement (e.g., using interfaces as described in connection with FIG. 7 to translate application data/activities). In the example of FIG. 9, the wireless communication system may include a client device 100, server equipment 102, intervening (client-side) traffic aggregator 104 (having storage 106), and intervening (server-side) traffic aggregator 108 (having storage 108). As an example, each of these components 100, 102, 104, and 108 in the wireless communication system may be implemented on a separate device or equipment 10 in system 8 of FIG. 1. If desired, one or more of these components may be implemented on the same device or equipment 10. Client device 100 may be communicatively coupled to a device implementing traffic aggregator 104 via communication link 101. Server equipment may be communicatively coupled to equipment implementing traffic aggregator 108 via communication link 103. The device implementing traffic aggregator 104 may be communicatively coupled to the equipment implementing traffic aggregator 108 via communication link 105.

As shown in FIG. 9, at operation 112, traffic aggregator 108 may send a service offer or selection request message to server equipment 102. In particular, a service offer or selection interface may be provided between traffic aggregator 108 and server equipment 102 running the server-side application for the service. The service offer interface may be used to define the type of data conveyance (e.g., downloading or streaming) available or used to provide the service.

At operation 114, client device 100 may send a service request to server equipment 103 (e.g., through traffic aggregators 104 and 108). As an example, the service requested may be song streaming.

At operation 116, server equipment 102 may provide configuration data to traffic aggregator 108 to set up service (e.g., to set up the process of providing the requested service to client device 100).

At operation 118, traffic aggregator 108 may provide configuration data to traffic aggregator 104 to set up service (e.g., to set up the process of providing the requested service to client device 100).

While the service requested at operation 114 is song streaming, operations 116 and 118 may set up service in such a manner that, at operation 120, traffic aggregator 104 may receive data downloaded in bulk (e.g., music files associated with one or more songs) from server equipment 102 (e.g., through traffic aggregator 108). Storage circuitry 106 for traffic aggregator 104 may store the downloaded data.

At one or more operations 122, client device 100 may access the data downloaded to traffic aggregator 104 in the manner as requested at operation 114. In the above song streaming example, traffic aggregator 104 may stream a song or portions of a song to client device 100 (one at a time or portions at a time) as requested by client device 100 at operation 114.

If desired, at one or more operations 122, client device 100 may also manipulate or selectively access the downloaded data (e.g., skip a downloaded song, repeat a downloaded song, etc.).

In some scenarios, at operation 124, traffic aggregator 104 may request (e.g., through traffic aggregator 108) that additional data to be downloaded. This request at operation 124 may occur at the request of client device 100 (e.g., client device 100 requesting to stream a song that has not been downloaded), may occur in anticipation of a future request of client device 100 (e.g., after client device 100 starts to stream the last un-played downloaded song in a playlist but more songs are in the playlist to be downloaded), may occur at regular intervals (e.g., the downloaded data at operation 120 represents a first batch of multiple batches of data to be downloaded), or generally may occur when additional data is required for the continuation of the service requested by client device 100.

At operation 126, traffic aggregator 104 may receive (download) the additional data in bulk (e.g., music files associated with one or more additional songs) from server equipment 102 (e.g., through traffic aggregator 108). Storage circuitry 106 may similarly store the additional downloaded data in addition to the previously stored data (if still relevant) or as a replacement for one or more portions of the previously stored data.

At one or more operations 128, client device 100 may access the newly downloaded data (and/or the previously downloaded data if still available) in a similar manner as described in connection with operation 122.

As described in connection with FIG. 9, using control interfaces, traffic aggregators 108 and 104 may be configured to receive data of one type (e.g., data downloaded in bulk), and translate that data into data of another type (e.g., streaming data) to provide to the client device. Among other advantages, by traffic aggregator 104 performing this translation operation, service equipment 102 may provide download data to aggregator 104 during short bursts of download activity (instead of continuously streaming data), thereby allowing longer periods of inactivity between downloads. At the same time, aggregator 104 ensures that the requested service of client device 100 is still provided.

These examples relating to music streaming are merely illustrative. If desired, the operations described in connection with FIG. 9 may similarly be applied to other services.

If desired, in some illustrative arrangements, a client (or server) device may assess its communication link to the client (or server) traffic aggregator to determine the capabilities of the communication link (e.g., the throughput of the communication link, the latency of the communication link, power consumption associated with the use of the communication link, etc.). Based on the link characteristics, the device may change the content being conveyed using the communication link to the traffic aggregator. As an example, in response to determining that the link to the traffic aggregator is a cellular link which may consume excess power at the device, the device may convey content associated with less data, and in response to determining that the link to the traffic aggregator is a low-power Bluetooth link, the device may convey content associated with more detail (e.g., using more data).

If desired, to further optimize data flow between client and server, one or more traffic aggregators between the client and the server may be dynamically updated such that an intervening traffic aggregator is not tied to a particular device or equipment. This may be especially helpful when, as an example, a communication link between a device and its traffic aggregator degrades and/or other more suitable devices are present to serve as a traffic aggregator for the device.

Figure 10:
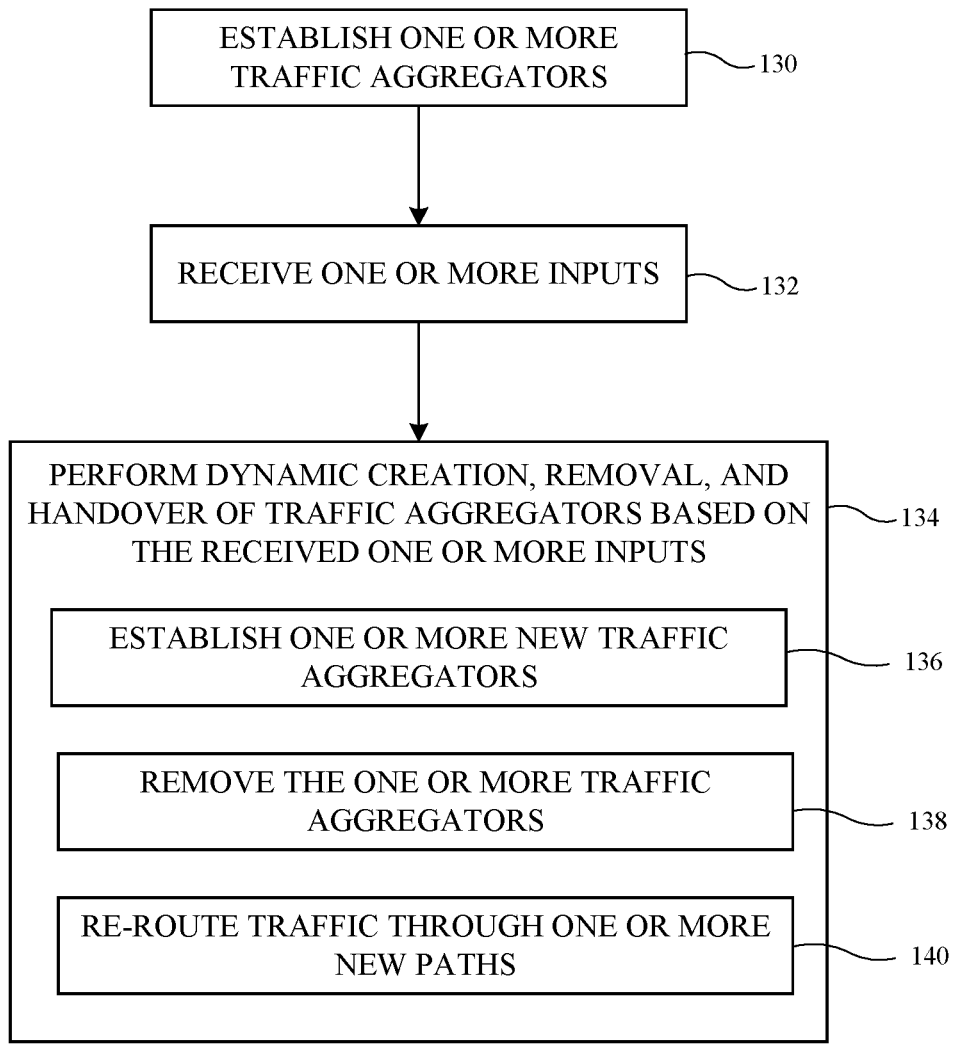
FIG. 10 is a flowchart of illustrative operations for updating traffic aggregators in a wireless communication system in accordance with some embodiments.

FIG. 10 is a flowchart of illustrative operations for dynamically updating traffic aggregators in a wireless communication system. One or more (e.g., all) operations in FIG. 10 may be performed by one or more processors implementing portions of wireless circuitry 24 such as one or more radios 26, implementing portions of processing circuitry 16, and/or implementing portions of other components in device 10-1, or performed by one or more processors implementing corresponding portions of other devices in system 8. The one or more operations in FIG. 10 may be stored as software instructions on storage circuitry (e.g., a non-transitory computer-readable storage medium) associated with the one or more processors and executable by the one or more processors to perform the one or more operations in FIG. 10.

At operation 130, one or more processors for implementing one or more traffic aggregators and/or may be established at any suitable number of devices. These one or more traffic aggregators may be configured and operate in a manner as described in connection with FIGS. 2-9. As an example, the one or more traffic aggregators may be implemented by processors in different devices and/or equipment in a wireless communication system such as system 8 in FIG. 1.

At operation 132, the one or more processors for implementing the one or more traffic aggregators, and/or the one or more processors on a client device or on server equipment may receive one or more inputs and may share the one or more inputs with each other. These inputs may include generated sensor data such as link quality of link to traffic aggregator, latency of link to traffic aggregator, sensor data indicative of relative movement (or location) between a client device and the client traffic aggregator, sensor data indicative of relative movement (or location) between server equipment and the server traffic aggregator and/or other sensor data, user inputs such as initiating one or more new applications, terminating one or more old applications, desired traffic profiles of applications and/or other user inputs, available devices or equipment for traffic aggregator deployment, and generally any other information indicative of a state of the wireless communication system.

At operation 134, the one or more processors for implementing the one or more traffic aggregators, and/or the one or more processors on a client device or on server equipment may perform dynamic creation, removal, and/or handover of traffic aggregators based on the received one or more inputs (e.g., in response to the inputs indicating one or more new devices configurable to serve as improved traffic aggregators). As an illustrative example, in response to determining that a link quality between a client device and an external device implementing the client traffic aggregator is below a given threshold, removal or handover (if a suitable alternative device exists) of the client traffic aggregator from the external device may be performed. As another illustrative example, in response to determining that a new device more suitable (e.g., less power consuming, provides higher data rates, etc.) for a client traffic aggregator exists, handover of the client traffic aggregator from the current device to the new device may be performed.

Performing operation 134, may include performing one or more of operations 136, 138, and 140, as an example. At operation 136, one or more processors at a new device or equipment may be configured to form (establish) a corresponding traffic aggregator (e.g., by receiving configuration data from one or more existing traffic aggregators, a client device, server equipment, etc.). If desired, multiple traffic aggregators may be formed at multiple new devices.

At operation 138, one or more processors at an existing device may be configured to stop performing the functions of a traffic aggregators to remove itself from the wireless communication system. If desired, before the existing device stops performing the functions of the traffic aggregator, it may transfer traffic aggregator configuration information (e.g., context data) to a new device (e.g., formed at operation 136). If desired, multiple traffic aggregators at multiple existing devices may be removed. At operation 140, the one or more processors for implementing the one or more current traffic aggregators, and/or the one or more processors on a client device or on server equipment traffic may re-route application traffic between the client device and the server equipment through to one or more new paths including one or more newly formed traffic aggregators (at operation 136) and away from one or more old paths including one or more removed traffic aggregators (at operation 138).

Figure 11:
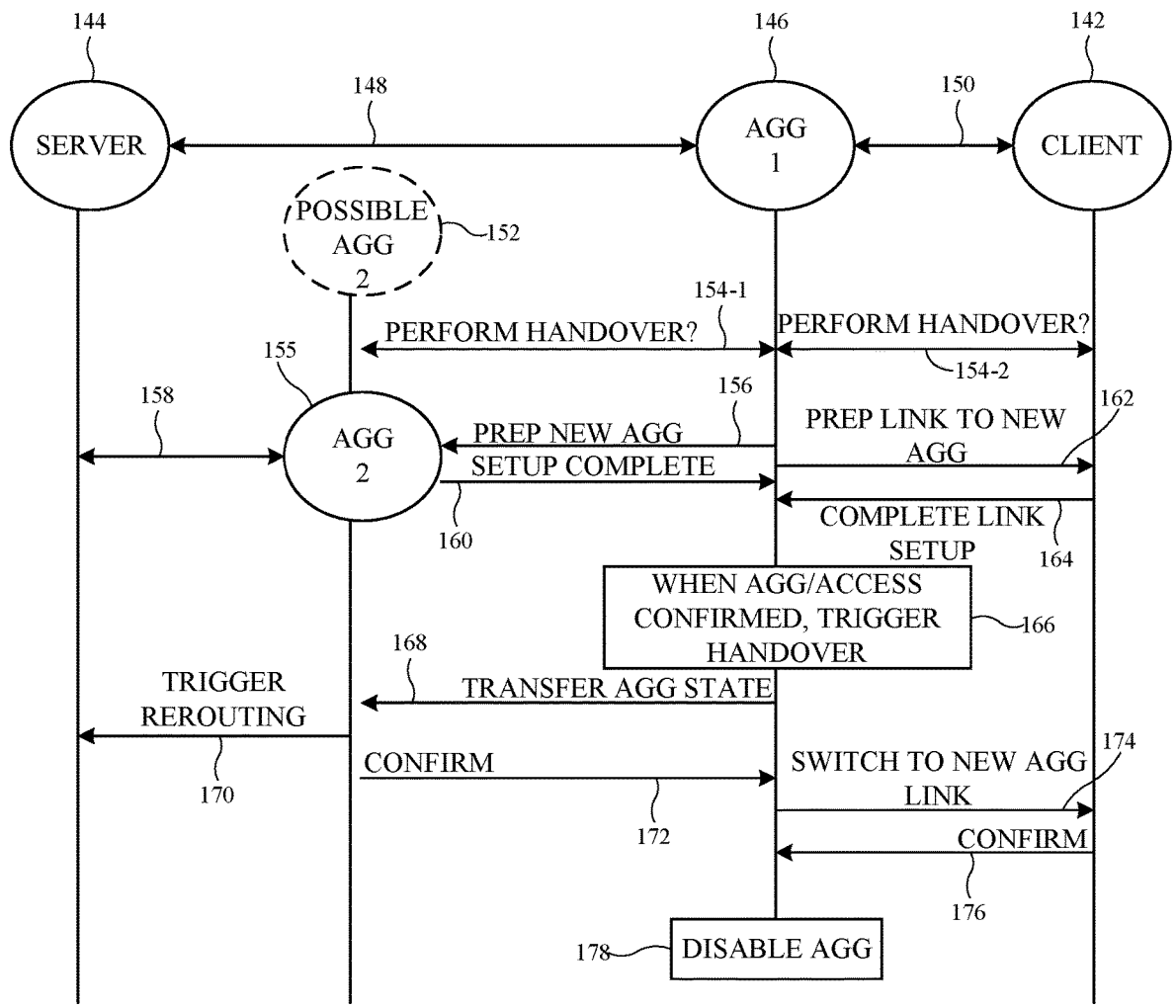
FIG. 11 is a diagram showing the flow of data between different components of a wireless communication system for an illustrative handover operation in accordance with some embodiments.

FIG. 11 is a diagram showing data flow within a wireless communication system such as system 8 in an illustrative arrangement for performing a handover operation. In the example of FIG. 11, the wireless communication system may include a client device 142, server equipment 144, and intervening (client-side) traffic aggregator 146. As an example, each of these components 142, 144, and 146 in the wireless communication system may be implemented on a separate device or equipment 10 in system 8 of FIG. 1. If desired, one or more of these components may be implemented on the same device or equipment 10. Client device 142 may be communicatively coupled to a device implementing traffic aggregator 146 via communication link 150. Server equipment may be communicatively coupled to the device implementing traffic aggregator 146 via communication link 148.

The wireless communication system may include an additional device 152 (one of devices 10 in system 8 in FIG. 1) that may be configurable as a (client-side) traffic aggregator. As examples, additional device 152 may be been recently turned on and detected by one or more components of wireless communication system, may have moved into the proximity of client device 142, may have been present for a prolonged period of time (e.g., since when traffic aggregator 146 was been established), etc.

In response to a triggering event or as a periodic operation, traffic aggregator 146 may communication with additional device 152 (at operation 154-1) and/or with client device 142 (at operation 154-2) to determine if handover is desired. If device 152 can serve as a better (client-side) traffic aggregator than the current device implementing traffic aggregator 146 (e.g., can form an improved communication link with client device 142 such as a link with higher throughput, a link with higher link quality, a link with lower latency, a link that consumes less power when used by client device 142, etc., in comparison with the current link between traffic aggregator 146 and client device 142), a handover operation may be performed.

At operation 156, the device implementing current traffic aggregator 146 may request and/or instruct device 152 (e.g., one or more processors in device 152) to form a new (client-side) traffic aggregator 155. Device 152 implementing new traffic aggregator 155 may be communicatively coupled to server equipment 144 via communication link 158.

After one or more processors of device 152 forms new traffic aggregator 155, at operation 160, device 152 may inform traffic aggregator 146 that a traffic aggregator has been set up in device 152.

At operation 162, traffic aggregator 146 may also request and/or instruct client device 142 (e.g., wireless circuitry in device 142) to form a new communication link with device 152 (e.g., aggregator 155 on device 152).

After forming the new communication link with device 152, client device 142 may inform traffic aggregator 146 that the new communication link with device 152 has been established.

After both confirmation messages at operations 160 and 164 have been received by aggregator 146, aggregator 146 may begin the handover operation. In particular, at operation 168, traffic aggregator 146 may convey its state information (e.g., configuration data) to new traffic aggregator 155 on device 152.

At operation 170, new traffic aggregator 155 may trigger re-routing of server application traffic by using new traffic aggregator 155 (e.g., using communication link 158 receive server application traffic to traffic aggregator 155).

At operation 172, new traffic aggregator 155 may confirm with the old traffic aggregator 146 that application traffic has been re-routed by using new traffic aggregator 155 (e.g., using communication link 158).

At operation 174, old traffic aggregator 146 may request and/or instruct client device 142 to switch client application traffic routing to using new traffic aggregator 155 and the new communication link coupled to aggregator 155 (e.g., the link established per operations 162 and 164).

At operation 176, client device 142 may confirm with the old traffic aggregator 146 that the new communication link and new traffic aggregator 155 are being used to handle client application traffic.

After both confirmation messages at operations 172 and 176 have been received by traffic aggregator 146, traffic aggregator 146 may, at operation 178, be disabled (e.g., the device implementing traffic aggregator 146 may stop performing traffic aggregator functions).

Figure 12:
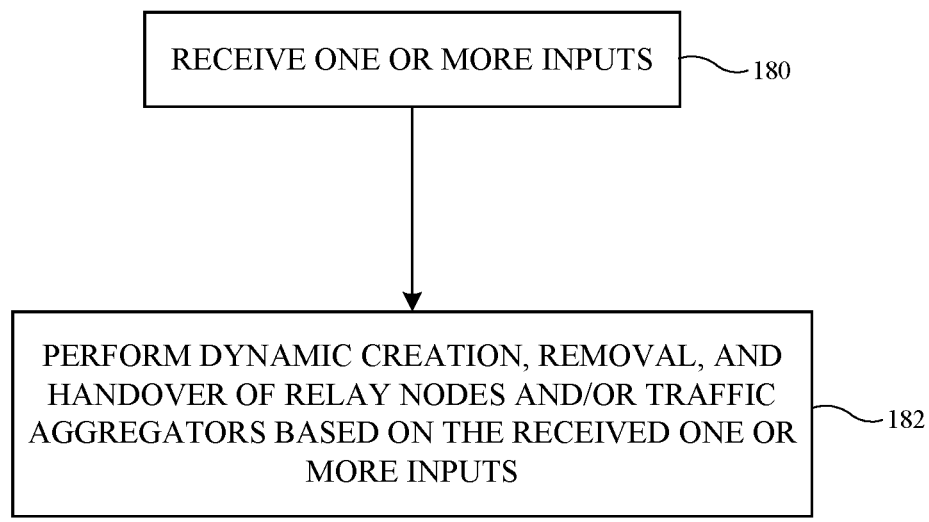
FIG. 12 is a flowchart of illustrative operations for updating relay nodes in a wireless communication system in accordance with some embodiments.

If desired, the operations described in connection with FIGS. 10 and 11 with respect to traffic aggregators may similarly be performed using relay nodes (e.g., one or more devices without aggregation functionalities through which application traffic travels through between the client device and the server equipment). FIG. 12 is a flowchart of illustrative operations for dynamically operating relay nodes in combination with traffic aggregators. One or more (e.g., all) operations in FIG. 12 may be performed by one or more processors implementing portions of wireless circuitry 24 such as one or more radios 26, implementing portions of processing circuitry 16, and/or implementing portions of other components in device 10-1, or performed by one or more processors implementing corresponding portions of other devices in system 8. The one or more operations in FIG. 12 may be stored as software instructions on storage circuitry (e.g., a non-transitory computer-readable storage medium) associated with the one or more processors and executable by the one or more processors to perform the one or more operations in FIG. 12.

In particular, in one illustrative arrangement, a wireless communication system may include a client device and server equipment, as well as a combination of traffic aggregators and/or relay nodes. To dynamically optimize the arrangement of relay notes and/or traffic aggregators, one or more processors in one or more devices in the wireless communication system, at operation 180, may receive one or more inputs. These inputs may be similarly to the inputs received at operation 132 in FIG. 10. In particular, these inputs may include information indicative of an optimal or improved path (compared to the current path) between the client device and the server equipment, and accordingly, one or more optimal or improved relay nodes and/or traffic aggregators (compared to the current relay nodes and/or traffic aggregators) associated with the improved path.

At operation 180, one or more processors in one or more devices in the wireless communication system may perform dynamic creation, removal, and/or handover of relay nodes and/or traffic aggregators based on the receive done or more inputs (e.g., in response to the inputs indicating one or more new devices configurable to serve as improved relay nodes and/or traffic aggregators).

The foregoing is merely illustrative and various modifications can be made to the described embodiments. The foregoing embodiments may be implemented individually or in any combination.

What is claimed is:

1. Wireless communication equipment comprising:
   processing circuitry configured to run a first application that generates a first data stream and to run a second application that generates a second data stream;
   a traffic aggregator configured to
   receive, from an additional traffic aggregator external to the wireless communication equipment, configuration information that includes a set of parameters expected to be exhibited by a corresponding data stream of each traffic class of a plurality of traffic classes,
   send a first request to the first application running on the processing circuitry to negotiate an attribute of application data traffic in the first data stream of the first application,
   send a second request to the second application running on the processing circuitry to negotiate an attribute of application data traffic in the second data stream of the second application,
   receive the first data stream from the first application and the second data stream from the second application, and
   generate an aggregated data stream that includes periodic data bursts of aggregated data, the periodic data bursts of aggregated data including the application data traffic in the first data stream and including the application data traffic in the second data stream, and the periodic data bursts of aggregated data exhibiting the set of parameters for a given traffic class of the plurality of traffic classes included in the received configuration information; and wireless circuitry configured to convey the aggregated data stream to the additional traffic aggregator.

2. The wireless communication equipment of claim 1, wherein the received configuration information includes information indicative of the first data stream and the second data stream belonging to the given traffic class.

3. The wireless communication equipment of claim 1, wherein the traffic aggregator is configured to generate an additional aggregated data stream that includes additional periodic data bursts of aggregated data of an additional traffic class of the plurality of traffic classes based on one or more additional data streams from one or more corresponding additional applications, the additional periodic data bursts of aggregated data exhibiting the set of parameters for the additional traffic class included in the received configuration information.

4. The wireless communication equipment of claim 3, wherein the set of parameters for the given traffic class specifies a first periodicity of the periodic data bursts of aggregated data and the set of parameters for the additional traffic class specifies a second periodicity of the additional periodic data bursts of aggregated data that differs from the first periodicity.

5. The wireless communication equipment of claim 1, wherein the wireless circuitry comprises a cellular radio component configured to convey the aggregated data stream using a cellular communication link.

6. The wireless communication equipment of claim 1, wherein the traffic aggregator is configured to define periods of inactivity between the periodic data bursts of aggregated data, and a radio in the wireless circuitry is configured to operate based on the periods of inactivity.

7. The wireless communication equipment of claim 1, wherein the wireless circuitry includes one or more processors configured to implement the traffic aggregator.

8. The wireless communication equipment of claim 1, wherein the processing circuitry includes one or more processors configured to implement the traffic aggregator.

9. A method of handling application traffic comprising:
receiving, by a traffic aggregator in a wireless communication device and through a wireless link, an aggregated data burst including application data traffic for a first application executing on the wireless communication device and including application data traffic for a second application executing on the wireless communication device;
exchanging one or more messages between the traffic aggregator and the first application, the one or more messages specifying one or more characteristics of a first data stream from the traffic aggregator to the first application;
sending, by the traffic aggregator, the application data traffic for the first application in the first data stream to the first application based on the aggregated data burst, the first data stream exhibiting the one or more characteristics specified in the one or more messages;
exchanging one or more additional messages between the traffic aggregator and the second application, the one or more additional messages specifying one or more characteristics of a second data stream from the traffic aggregator to the second application; and
sending, by the traffic aggregator, the application data traffic for the second application in the second data stream to the second application based on the aggregated data burst, the second data stream exhibiting the one or more characteristics specified in the one or more additional messages.

10. The method of claim 9, wherein exchanging the one or more messages includes sending, by the traffic aggregator, a first message specifying the one or more characteristics of the first data stream to the first application and wherein exchanging the one or more additional messages includes sending, by the traffic aggregator, a second message specifying the one or more characteristics of the second data stream to the second application.

11. The method of claim 10, wherein the first message and the second message each specify at least a data stream data rate, a data stream data transfer protocol, a data stream data compression, or a data stream cadence.

12. The method of claim 9, wherein the traffic aggregator is executed on one or more processors of the wireless communication device and the first application is executed on the one or more processors of the wireless communication device, the method further comprising:
storing, at the wireless communication device, the application data traffic for the first application as a downloaded file.

13. The method of claim 12 further comprising:
after storing the downloaded file at the wireless communication device, streaming the downloaded file to the first application.

14. The method of claim 9, wherein the wireless link is a cellular communication link.

15. A wireless communication system comprising:
a first wireless communication device having one or more processors configured to run a first application and to run a second application; and
a second wireless communication device communicatively coupled to the first wireless communication device via a first wireless communication link and having one or more processors configured to execute a traffic aggregator that
receives, from the first wireless communication device via the first wireless communication link, first application traffic in a first data stream for the first application,
receives, from the first wireless communication device via the first wireless communication link, second application traffic in a second data stream for the second application, and
transmits, to wireless communication equipment external to the first wireless communication device and external to the second wireless communication device, an aggregated data stream that includes the first application traffic and the second application traffic via a second wireless communication link communicatively coupling the second wireless communication device to the wireless communication equipment.

16. The wireless communication system defined in claim 15, wherein the first wireless communication link is a non-cellular communication link.

17. The wireless communication system defined in claim 16, wherein the second wireless communication link is a cellular communication link.

18. The wireless communication system defined in claim 16, wherein the second wireless communication device is configured to perform a traffic aggregator handover operation based on a characteristic of the non-cellular communication link.

19. The wireless communication system defined in claim 15, wherein the second wireless communication device is configured to perform a traffic aggregator handover operation based on detecting a third device configurable to implement a traffic aggregator for the first wireless communication device.

20. The wireless communication system defined in claim 15, wherein the second wireless communication device is configured to initiate a traffic aggregator handover operation to configure a third device to implement a traffic aggregator for the first wireless communication device based on an update to at least one of the first application or the second application.

* * * * *